April 29, 1941.   G. E. MOORE   2,239,730
ANTISKID DEVICE
Filed March 21, 1938
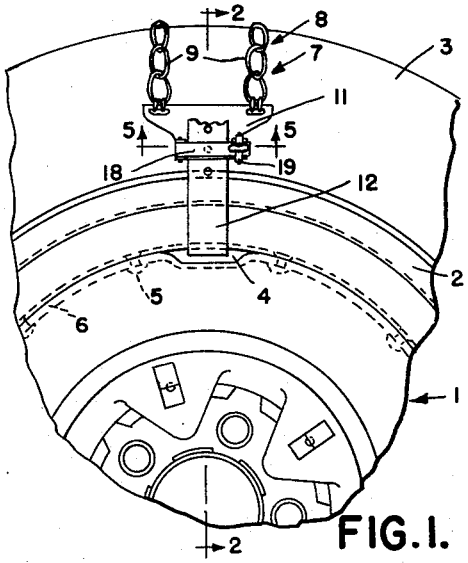
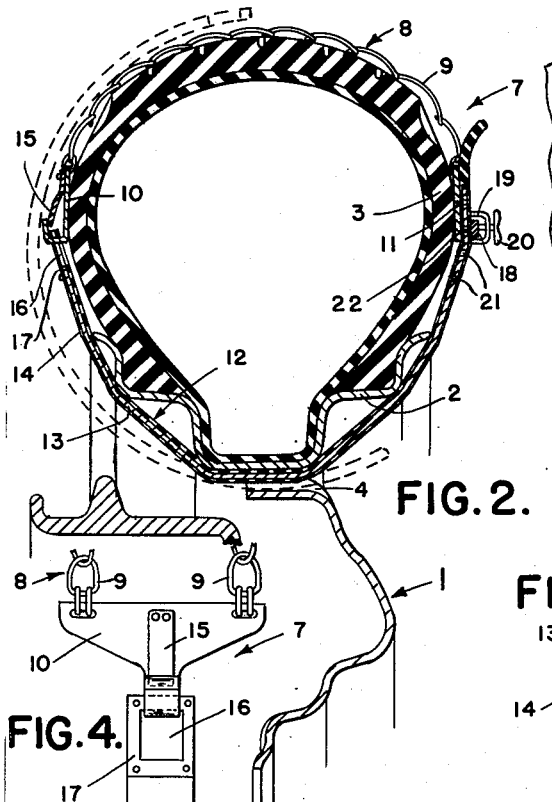
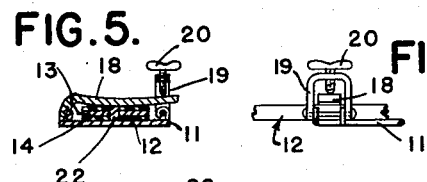
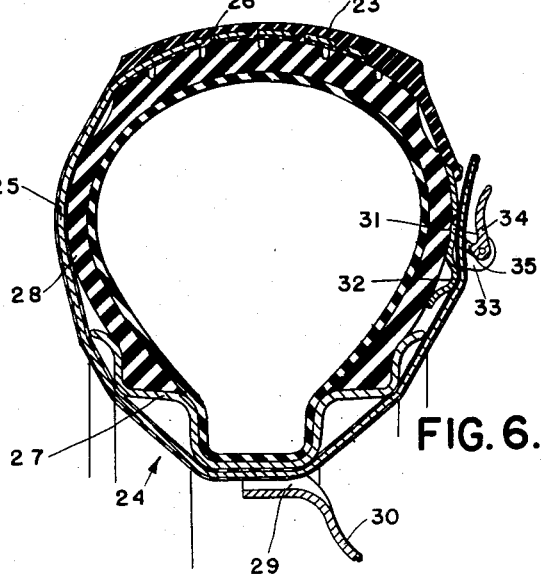
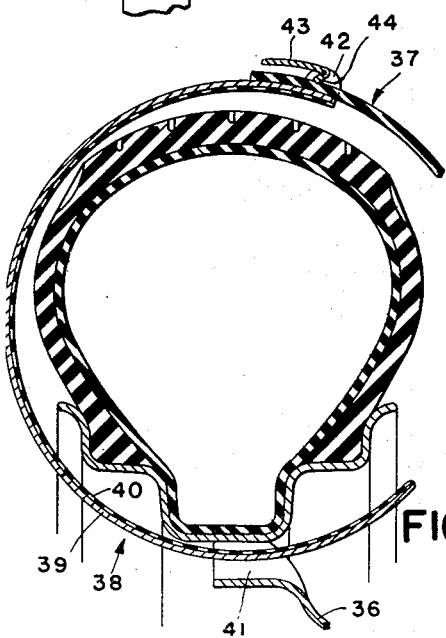
*INVENTOR*
GEORGE E. MOORE
BY
*ATTORNEYS*

Patented Apr. 29, 1941

2,239,730

UNITED STATES PATENT OFFICE 2,239,730

ANTISKID DEVICE

George E. Moore, Dearborn, Mich.

Application March 21, 1938, Serial No. 197,264

4 Claims. (Cl. 152—213)

The invention relates to antiskids and refers more particularly to antiskids for use with motor vehicle wheels.

With the present day construction of motor vehicles and wheels it is very difficult to assemble the present day antiskids with the wheels because of the limited clearance allowed by the fenders and their aprons and also because of the relatively small openings formed in the wheels.

One of the objects of my invention is to overcome this difficulty by so constructing the antiskid that it may be assembled with the wheel without the necessity of reaching to the inboard side of the rim and tire.

Other objects are to provide an improved antiskid which may be assembled mainly from the outboard side of the wheel; to provide the antiskid with a strap portion which is constructed to normally retain a longitudinally curved shape to adapt it to be passed in a generally radial direction about the inboard sides of the rim and tire; and to provide an improved device for securing the tread portion of the antiskid to the strap portion.

These and other objects of the invention will become apparent from the following description, taken in connection with the accompanying drawing, in which Figure 1 is an outboard elevation of a vehicle wheel showing an antiskid embodying my invention applied thereto;

Figure 2 is an enlarged cross section on the line 2—2 of Figure 1;

Figure 3 is an end view of an outboard portion of the antiskid;

Figure 4 is an inboard elevation of a portion of the antiskid;

Figure 5 is a cross section on the line 5—5 of Figure 1;

Figure 6 is a view similar to Figure 2 showing a modified construction of antiskid;

Figure 7 is a view similar to Figure 2 showing another embodiment of my invention.

Referring to Figures 1 to 5 inclusive, the motor vehicle wheel comprises the wheel body 1 and the rim 2 on which is mounted the pneumatic tire 3. The wheel body for which my anti-skid is particularly designed is of the present day type having relatively small openings therethrough, for example, a combined disc and artillery wheel body having relatively short spokes forming radially narrow openings therebetween, or a disc body having small openings near or at its periphery. As shown in the present instance, the wheel body is of the disc type having equally spaced portions of its periphery depressed to form the radially narrow openings 4. The rim is preferably of the drop-center type having the base of its well permanently secured by suitable means, such as the rivets 5, to the peripheral flange 6 of the wheel body.

7 is one of a series of antiskids which may be applied to each wheel. The antiskid comprises the tread portion 8 which in operative position extends outside the tread of the tire and which, as shown, has the two cross chains 9 and the two metal plates 10 and 11 at its inboard and outboard ends respectively and to which the ends of the cross chains are connected. The antiskid also comprises the strap portion 12 which is adapted in operative position to extend inside the rim and which is preferably formed of the resilient metal strap 13 embedded in the rubber covering 14. The strap portion is constructed to normally retain a longitudinally curved shape and more particularly a generally semi-circular shape to adapt the same to be passed in a generally radial direction about the inboard sides of the rim and tire. The strap portion is also of a size to adapt the same to be passed longitudinally through the radially narrow opening 4 of the wheel body.

The plate 10 at the inboard end of the tread portion is preferably hook-shaped and provided with the resilient tongue 15 fixedly secured at one end thereof. The inboard end of the strap portion 12 is preferably provided with the opening 16 to permit the strap portion to be engaged with the hook-shaped plate by depressing the resilient tongue. The inboard end of the strap portion is preferably reinforced by the plate 17 secured to the inboard side of the metal strap 13 and also formed with an opening registering with the opening 16.

To facilitate connecting the inboard end of the strap portion to the inboard end of the tread portion, the strap portion has a length to extend from the outboard side of the wheel body to the zone of the tread of the tire, as shown particularly in the dotted lines in Figure 2, so that after the strap portion has been passed longitudinally through the opening 4 of the wheel body and about the inboard sides of the rim and tire in a generally radial direction to assume the position such as indicated by the dotted lines in Figure 2, the hook-shaped plate 10 can be readily assembled with the inboard end of the strap portion by placing this hook-shaped plate beneath the inboard end and then depressing the latter to snap same into place. After this connection is made, the strap portion is then moved to operative position and its outboard end portion is detachably connected to the outboard end of the tread portion, the construction being as follows: The outboard plate 11 of the tread portion has pivotally secured to one edge thereof the resilient bowed bar 18 and to the opposite edge thereof the yoke 19, which latter is adapted to be swung over the free end of the bar when the latter is in operative clamping position. This yoke carries the adjustable clamping screw 20 which may be tightened down by hand to firmly press the bar against the outboard side of the strap portion. It is noted that the curvature of the bar is such that it first engages the strap portion near its center. The strap portion is provided with the longitudinally spaced openings 21 which are adapted to receive the prong or rivet 22 extending transversely from the outboard plate 11. With this construction, the outboard end portion of the strap portion is adapted to be secured to the outboard end of the tread portion both by reason of the prong or rivet extending into a hole in the strap portion and also by the clamping pressure exerted by the resilient bar.

In the modification illustrated in Figure 6, the antiskid has the tread portion 23 and the strap portion 24, the two being permanently secured together at the inboard side and being adapted to be detachably secured together at the outboard side. The strap portion is preferably formed of the resilient metal strap 25 which extends into and is anchored in the tread portion as by being formed with the openings 26 through which the material forming the tread portion, such as rubber, extends. The metal strap is also preferably covered by rubber to avoid abrasion of the rim 27 and the casing of the pneumatic tire 28. The strap portion normally has a longitudinal curvature which is generally semi-circular so that the antiskid may be assembled with the wheel by placing the outboard end of the strap portion over the tire tread and then moving the antiskid in a generally radial direction to pass the same about the inboard sides of the tire and rim and through the opening 29 formed in the wheel body 30, the antiskid first having been placed in substantially radial alignment with the opening.

The outboard end of the strap portion is secured to the outboard end of the tread portion by clamping the strap portion to the plate 31 upon the tread portion. The plate is provided with the bead 32 extending in an outboard direction and is also provided at its edges radially outwardly beyond the bead with the ears 33 between which is pivoted the bell crank shaped lever 34 having the short arm 35 engageable with the outboard side of the strap portion. The end of this arm engageable with the strap portion is preferably roughened or serrated to more firmly engage the strap portion. The position of the lever is such that when it is swung into clamping position it will flex the strap portion about the bead 32 to thereby serve more effectively in clamping the strap portion to the tread portion.

Figure 7 illustrates another modification in which the wheel body 36 is of that type having relatively short spokes providing radially narrow openings therebetween. As illustrated in this figure, the antiskid 37 may be of usual present day construction having a tread portion and a strap portion permanently secured at one end to the tread portion and adapted to be detachably secured at the other end to the tread portion. To facilitate assembly of the antiskid with the wheel, I have provided the device 38 which is preferably formed of the metal strap 39 and the non-abrasive material 40, such as rubber, which is located at the side of the strap toward the rim. This device normally has a generally semi-circular shape to adapt it to be passed in a generally radial direction about the inboard sides of the rim and tire. Its size is such that it is adapted to be passed longitudinally through an opening 41 formed between the spokes of the wheel body and its length is such that it extends from the outboard side of the wheel body to near the outboard side of the tread of the tire when in operative position. The metal strap is preferably resilient. The device is provided at one end with the ears 42 which extend from the opposite edges of the metal strap and between which is pivotally mounted the bell crank shaped clamping lever 43 having the short arm 44 engageable with the strap portion of the antiskid to clamp the same firmly against the metal strap. After the clamping the device may be pulled back through the opening 41 thereby pulling the antiskid. When the strap portion of the antiskid may be readily grasped at the outboard side of the wheel body, the device may be released from the strap portion, after which the antiskid may be properly positioned on the tire and its strap portion secured to its tread portion at the outboard side of the tire.

What I claim as my invention is:

1. An antiskid for use with a wheel having a body with an opening therethrough, a rim and a tire, said antiskid comprising a tread portion adapted to extend outside the tread of the tire and a strap portion adapted to extend inside the rim and be detachably connected to the inboard and outboard ends of said tread portion, said strap portion being generally semi-circularly shaped to adapt the same to be passed longitudinally through the wheel body opening from the outboard side of the wheel body and then along the inboard sides of the rim and tire, said strap portion also having a length to extend from the outboard side of the wheel body to the zone of the tire tread to adapt the same to be detachably connected to the inboard end of said tread portion in the zone of the tire tread.

2. An antiskid for use with a motor vehicle wheel having a wheel body, a rim and a tire, said antiskid comprising a tread portion adapted to extend outside the tread of the tire and a strap portion adapted to extend inside the rim and to have snap connection with the inboard end of said tread portion and an adjustable connection with the outboard end of said tread portion, said strap portion being of a size to be passed longitudinally through the wheel body and also being constructed to normally retain a longitudinally curved shape to be passed in a generally radial direction about the inboard sides of the rim and tire.

3. An antiskid for use with a motor vehicle wheel having a wheel body, a rim and a tire, said antiskid comprising a tread portion adapted to extend outside the tread of the tire, a normally generally semi-circularly shaped strap portion adapted to extend inside the rim, a hook upon said tread portion for snap engagement with said strap portion, a plate also upon said tread portion, and means carried by said plate for resiliently clamping said strap portion to said plate.

4. An antiskid for use with a motor vehicle wheel having a wheel body, a rim and a tire, said antiskid comprising a tread portion adapted to extend outside the tread of the tire, a normally generally semi-circularly shaped strap portion adapted to extend inside the rim, a hook upon one portion for snap engagement with the other portion, a plate upon one portion, and means carried by said plate for resiliently clamping the other portion to said plate.

GEORGE E. MOORE.